US008382323B2

(12) United States Patent  (10) Patent No.: US 8,382,323 B2
Robb  (45) Date of Patent: Feb. 26, 2013

(54) INDIVIDUALLY CONTROLLABLE MULTI-COLOR ILLUMINATION UNITS

(76) Inventor: John R. Robb, Stafford, TX (US)

( * ) Notice: Subject to any disclaimer, the term of this patent is extended or adjusted under 35 U.S.C. 154(b) by 338 days.

(21) Appl. No.: 12/660,381

(22) Filed: Feb. 25, 2010

(65) Prior Publication Data

US 2010/0157601 A1  Jun. 24, 2010

Related U.S. Application Data

(63) Continuation-in-part of application No. 12/316,413, filed on Dec. 12, 2008, now Pat. No. 7,854,614.

(60) Provisional application No. 61/007,746, filed on Dec. 14, 2007.

(51) Int. Cl.
*F21V 21/00* (2006.01)

(52) U.S. Cl. .............................. 362/249.02; 362/249.06

(58) Field of Classification Search .................. 362/240, 362/249.06, 249.02, 249.16
See application file for complete search history.

(56) References Cited

U.S. PATENT DOCUMENTS

| 1,650,014 A | 11/1927 | Goldrick |
| 1,953,864 A | 4/1934 | Morris |
| 1,957,714 A | 5/1934 | Jones |
| 2,007,617 A | 7/1935 | Sheward |
| 2,519,933 A | 8/1950 | Rouault |
| 2,564,520 A | 8/1951 | Blasdell |
| 2,652,546 A | 9/1953 | Christner |
| 2,673,965 A | 3/1954 | Cass |
| 3,012,798 A | 12/1961 | Berger |
| 3,116,940 A | 1/1964 | Jines |
| 3,328,741 A | 6/1967 | Brown |
| 4,746,297 A | 5/1988 | Soleau |
| 4,978,306 A * | 12/1990 | Robb ............................... 439/8 |
| 5,018,980 A | 5/1991 | Robb |
| 5,718,980 A * | 2/1998 | Koch et al. .................... 428/428 |
| 7,413,325 B2 * | 8/2008 | Chen ......................... 362/249.01 |
| 7,825,822 B2 * | 11/2010 | Hornsby et al. ........ 340/815.46 |
| 8,138,941 B2 * | 3/2012 | Smith et al. ............. 340/815.45 |
| 2005/0213324 A1 * | 9/2005 | Chen ............................ 362/249 |
| 2006/0262529 A1 * | 11/2006 | Hornsby et al. .............. 362/231 |
| 2007/0195527 A1 * | 8/2007 | Russell ......................... 362/240 |
| 2007/0247852 A1 * | 10/2007 | Wang ........................... 362/294 |
| 2009/0045933 A1 * | 2/2009 | Smith et al. .................. 340/468 |
| 2009/0154883 A1 | 6/2009 | Robb |
| 2010/0321932 A1 * | 12/2010 | Tong ............................. 362/231 |

* cited by examiner

*Primary Examiner* — John A Ward
(74) *Attorney, Agent, or Firm* — Sue Z. Shaper

(57) ABSTRACT

Individually controllable multi-colored illumination units, including light beads and a light wand, the beads preferably connected to the wand or to each other through conductivity elements providing electric conductivity for at least four separate lines through the connection while providing for full relative rotation and limited swivel between the connection elements.

7 Claims, 9 Drawing Sheets

Attachment A-3
Cross Section through a Male/Female Connector – Component IIIa  (no scale)

Cross Section through a Closure Bead – Component IVa  (no scale)

Attachment B-2
Transverse Cross Section through a LIGHT WAND – Component Ib  (no scale)

Attachment B-3
Cross Section through a Multiple Port Connector – Component IIb (no scale)

Attachment C-1
Comparison of a Simple Parallel Circuit Schematic to Prior Art    (no scale)

Attachment C-2
Comparison of a Simple Parallel Circuit to Water Pipe Network    (no scale)

INDIVIDUALLY CONTROLLABLE MULTI-COLOR ILLUMINATION UNITS

CROSS REFERENCE TO RELATED APPLICATIONS

This invention comprises a continuation-in-part of my co-pending application U.S. Ser. No. 12/316,413 filed Dec. 12, 2008 claiming priority in turn to U.S. provisional application Ser. No. 61/007,746, filed Dec. 14, 2007, said regular application entitled Multi-Contact Universally Jointed Power and/or Signal Connector Devices and said provisional entitled to Snap-apart Universal Jointed Electrical Connector Device, both having the same inventor. Said U.S. application Ser. No. 12/316,413 is hereby incorporated by reference herein in its entirety.

FIELD OF THE INVENTION

The instant invention relates to illumination units including light beads utilizing multi-contact universally jointed power and/or signal connector devices.

BACKGROUND OF THE INVENTION

The instant invention represents improvements to my prior inventions embodied in two prior US patents, U.S. Pat. No. 4,978,306 and U.S. Pat. No. 5,018,980, as well as to my above referenced U.S. pending patent application Ser. No. 12/316,413.

The instant illumination unit, including its light bead and light wand embodiments, is enabled by multi-contact universally jointed power and/or signal connector devices disclosed in co-pending patent application Ser. No. 12/316,413. Such connector devices permit forming electrical connections for at least four separate lines of electrical communication through a joint providing for full rotation and partial swivel between the two devices. In the attached drawings the four separate electrical lines are indicated as red, green, blue and black, for clarity.

The connector devices are referred to as mateable plugs and sockets. It is somewhat arbitrary as to which connector device should be called the plug and which should be called the socket. Herein and in the claims, whenever a mateable plug and socket are referred to, it should be understood that the two units could be reversed. There is no particular magic as to which device comes first or where, although there might be manufacturing considerations.

Given a plug and socket that can be joined to provide electrical communication between at least four different electric lines while providing for full rotation and limited swivel between plug and socket, the formation of a string of light beads is possible providing at least three separately controllable colored strings, each colored string independently controllable, the beads electrically arranged in parallel.

FIGS. 1, 2 and 5 offer schematic representations of a decorative lighting device referred to as a "light bead." FIG. 3 illustrates mateable plug and socket connectors. FIG. 4 illustrates an insulating end unit.

FIGS. 6 through 9 offer schematic representations of types of multi port connectors.

FIGS. 10 and 11 illustrate the principles of parallel circuitry, utilized in the instant illumination units.

It should be understood that the LEDs as illustrated in the figures, are assumed to incorporate a shunt such that electricity passes through the LED whether or not the LED is itself operable. Such maintains the parallel connections preferably embodied in the electric circuits. (Alternately, wiring could be provided.)

It should also be understood that, preferably, either the LEDs provide a one way electric flow device or switch, to prevent reverse electric flow, or that such a device or switch is provided separately, as useful.

The illustrated illumination device is capable of being connected to independent controllers in order to create independent on/off conditions for each line, indicated as separately colored lines. Such provides flexibility and improvement to the decorative lighting devices of the prior art.

The incorporation of separately controllable multiple light emitting elements allows for providing a color spectrum or a rainbow effect that can either cycle over time or be fixed, to match a user's decorative preferences.

Provision of a weatherproof gasket as illustrated in several drawings permits use of the new decorative devices in outdoor environments, a further improvement over the prior art.

Long strands of the light bead type lighting device can be used for seasonal lighting as appropriate for holidays. With the improvements described herein, the light bead devices can be used for both indoor and outdoor lighting displays. In addition, the light beads could accept digital programming signals to create multiple color arrangements and alternate on/off conditions for pre-designed lighting patterns.

Light wands, forming lighted sticks, could be particularly useful to extend along structural sections such as the trunk of a tree or along a branch. In fact, a light wand could be decorated to form a tree branch.

Light beads can be manufactured in various sizes as appropriate for the application or to create strands of light beads of graduated size. Light beads of either uniform or graduated sizes could be draped to create illuminated garlands such as on the end of Christmas tree branches.

SUMMARY OF THE INVENTION

The invention includes a light bead including at least three LED's within an at least partially transparent/translucent housing. The housing has at least one universal port unit, defined below, providing at least four separate conductivity elements (also defined below.) Each LED is electrically connected within the housing to a separate conductivity element of the universal port unit as well as to one common conductivity element providing a return line.

The beads may be connected through conductivity elements that provide electric conductivity through the bead from a mateable plug to a mateable socket on the bead, or vice versa, or between two plugs or two sockets. A mating of plug and socket preferably provides for full relative rotation between the plug and socket and limited swivel between the plug and socket while maintaining electric conductivity through the plug and socket for at least four electric lines.

The invention includes a multi port connector comprising a housing providing a plurality of universal port units. Preferably the universal port units are wired within the housing to enable attachment of a plurality of electrical devices to the universal port units in parallel.

The invention includes an end unit comprising one of a mateable socket and mateable plug, the end unit structured to mate with and provide electrical insulation for exposed conductivity elements of a mated plug or socket.

The invention includes an end light bead for an illumination unit where the end light bead includes at least three LED's within an at least partially transparent/translucent housing. Conductivity elements associated with a universal port unit of the light bead provide individual electric conductivity to each LED within the bead. The mated mateable plug and socket provides for full relative rotation and limited swivel between the conductivity elements while maintaining electric conductivity for at least four lines through the mated plug and socket.

The invention also includes a wand of light beads with universal port units wherein light beads are each connected to a wand base element.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A better understanding of the present invention can be obtained when the following detailed description of the preferred embodiments are considered in conjunction with the following drawings, in which.

The drawings are primarily illustrative. It would be understood that structure may have been simplified and details omitted in order to convey certain aspects of the invention. Scale may be sacrificed to clarity.

DETAILED DESCRIPTION OF THE PREFERRED EMBODIMENTS

"Conductivity element" is used herein to indicate an exposed electrically conducting surface or area on a universal port unit.

"Universal port unit" is used herein to indicate one of a mateable plug and a mateable socket, structured to mate together into a joint and to provide, when mated, full rotation and limited swivel between the two units while maintaining electric communication through the jointed units for at least four independent lines, utilizing thereby mating conductivity elements located on the plug and the socket.

The ensuing description of preferred embodiments of the invention is presented for purposes of illustration and description, and is not intended to be exhaustive or to limit the invention to the precise form or embodiment disclosed. The description is selected to best explain the principles of the invention and their practical application to enable others skilled in the art to best utilize the invention in various embodiments. Various modifications as are best suited to a particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustrations herein have not necessarily been produced to scale.

Figure 1:
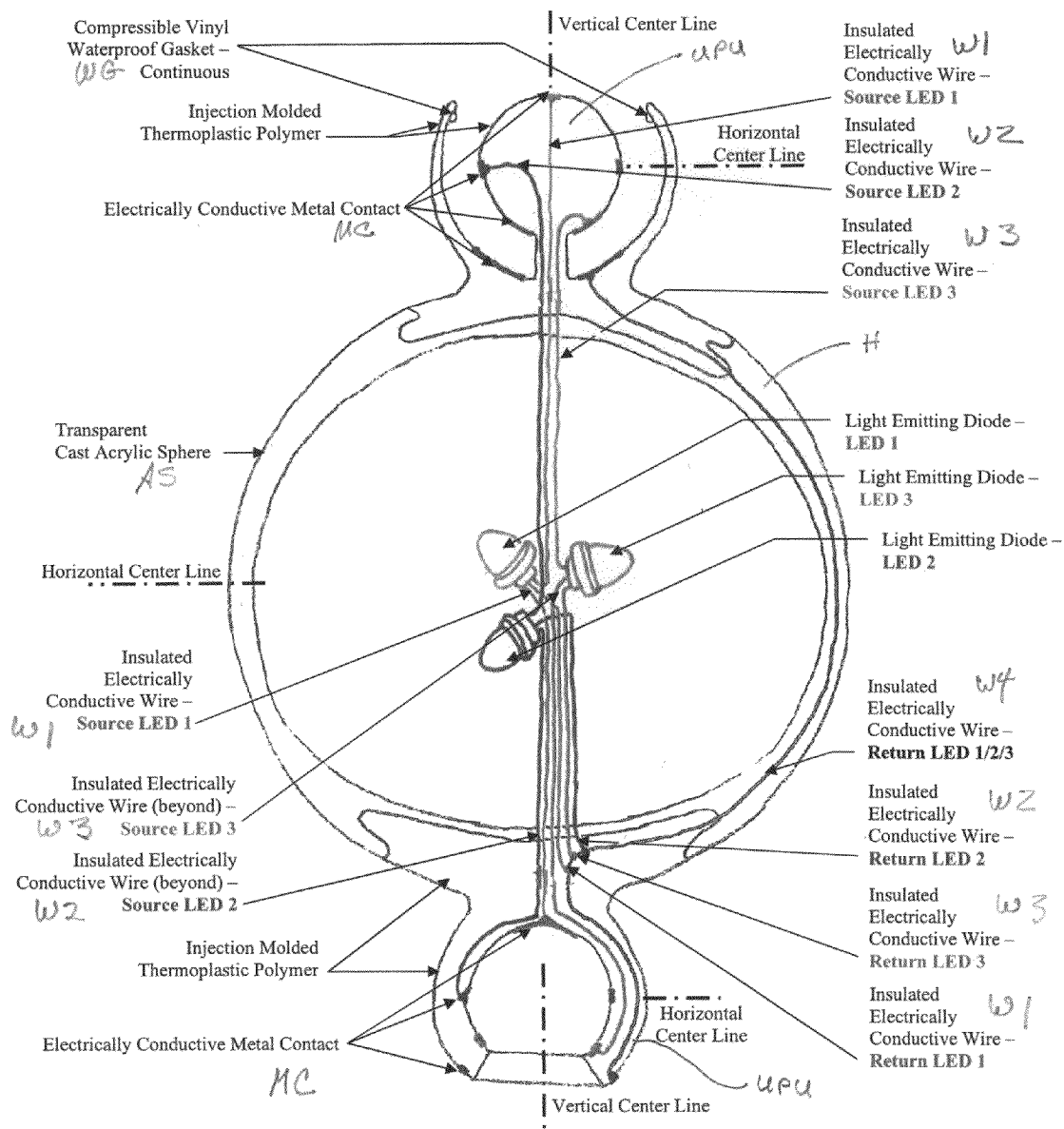
FIG. 1 illustrates a cross-section through a single light bead.

FIG. 1 illustrates a cross section through a single light bead having two separated universal port units, sometimes referred to as a mateable plug and a mateable socket. The mateable plug and mateable socket, when mated into a joint, provide for electrical conductivity through the joint for four independent electric lines while at the same time providing for full rotation and limited swivel between the plug and socket. Reference is made to co-pending application Ser. No. 12/316,413 incorporated by reference herein in order to more fully understand the structure of the mateable plug and socket.

The mateable plug and mateable socket and spherical body therebetween form the housing H of a light bead of FIG. 1. The body portion of the housing between the two universal port units is preferably at least partially constructed of a transparent or translucent substance, such as a cast acrylic sphere. The body portion of the universal plug units is preferably constructed of an injection molded thermo plastic polymer. A compressible vinyl waterproof gasket WG is shown on one of the two universal port units. Three LEDs, LED 1, LED 2, and LED 3, are shown in the central body of the housing between the two universal port units. Each LED is preferably a different color and is so colored in the drawings for clarity. A separate electrical line, W1, W2 and W3 runs from each universal port unit through an LED and to the other universal port unit. A return line W4 runs through the body of the housing between the two universal port units. In such fashion the three LEDs can be wired in parallel with subsequent LEDs in subsequent connected light beads.

The electrically conducted metal contacts MC shown in the plug and socket versions of the universal port units provide conductive elements within the port unit and four different electric lines. Their function is disclosed in greater detail in Ser. No. 12/316,413 incorporated by reference. The compressible vinyl waterproof gasket WG of certain universal port units provides an electrically insulating joint between a plug and socket such that the electrical units may be used out of doors.

The light bead of FIG. 1 is designed to be connected in sequence to form a chain. The light bead of FIG. 2 is designed as an end light bead or as a single light bead.

Figure 2:
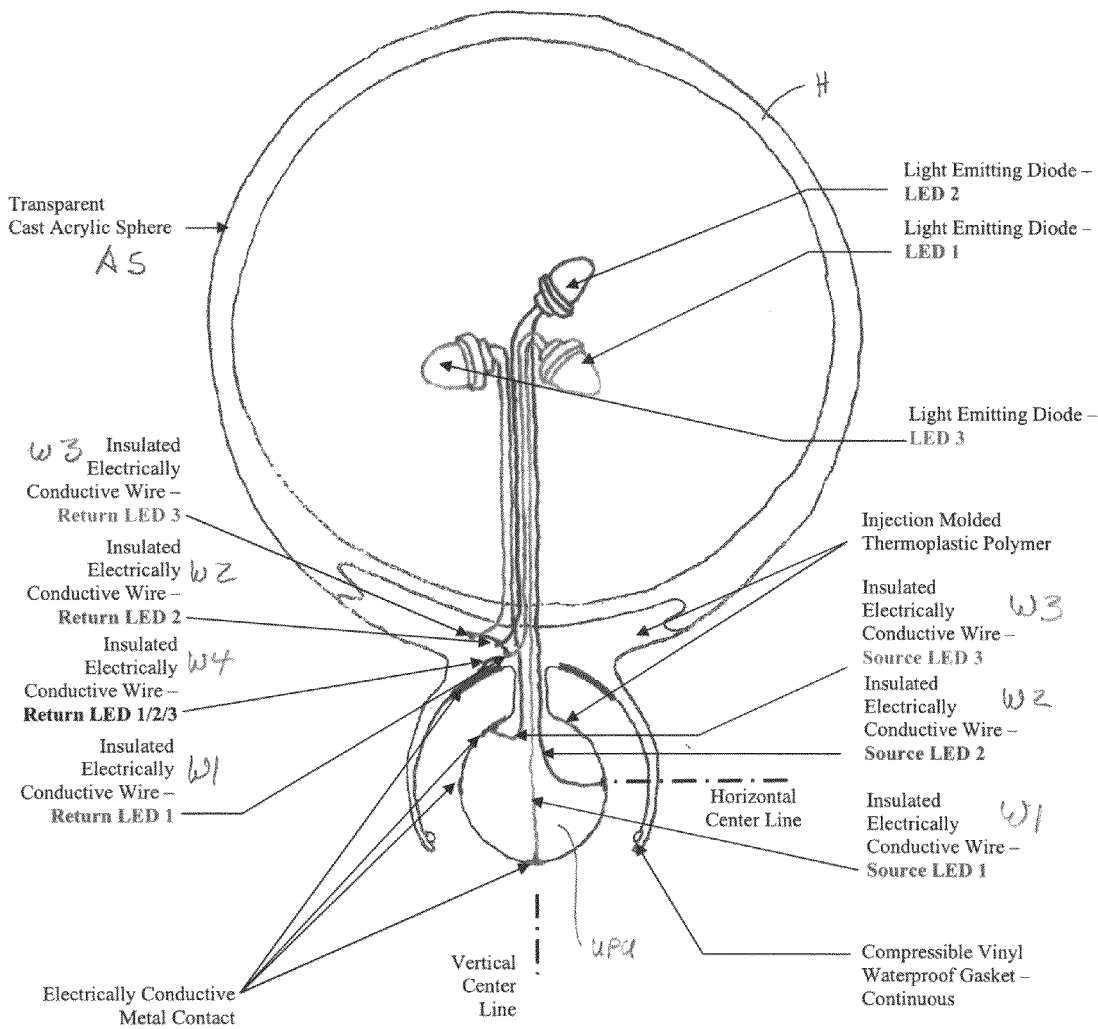
FIG. 2 illustrates a cross-section through an end light bead.

As can be seen from the wiring of FIG. 1 and FIG. 2, independent current runs from the independent conductivity elements on the universal port unit independently to each LED and then back to a common return line, line W4, colored black in the drawings.

Figure 3:
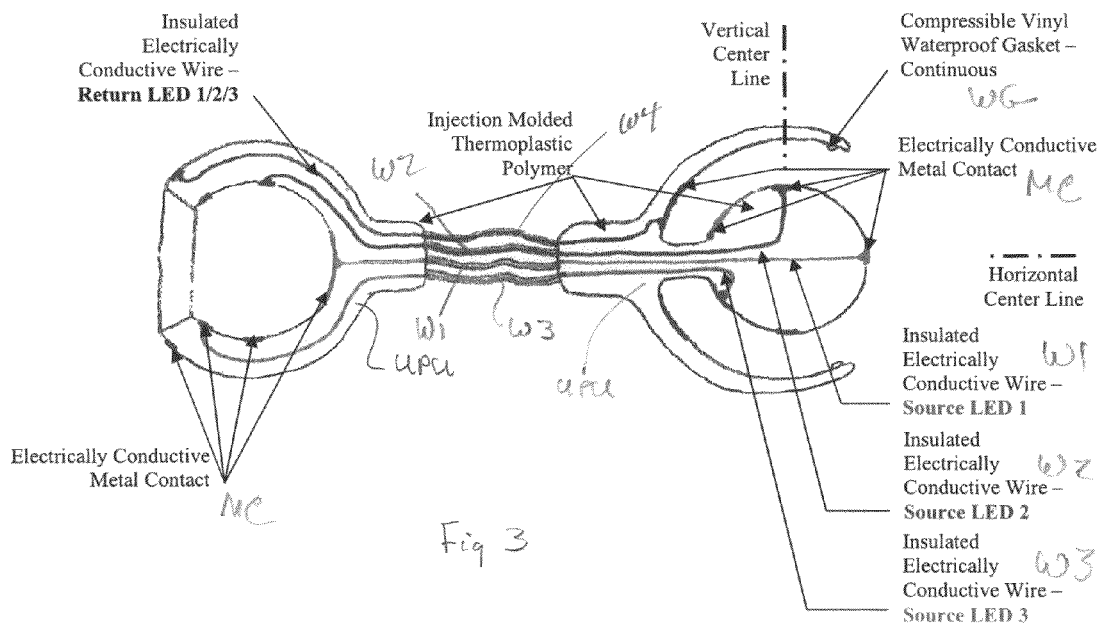
FIG. 3 illustrates a cross-section through mateable plug and socket connectors, universal port units.

FIG. 3 illustrates the connection of the independent wires W1, W2, W3 and W4 from and between two universal port units, omitting any electrical devices therebetween for purposes of clarity.

Figure 4:
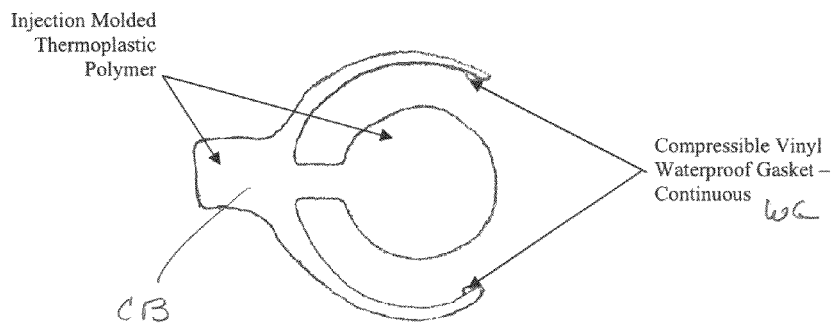
FIG. 4 illustrates a cross-section through a closure bead.

FIG. 4 illustrates a cross section through a closure bead CB. Closure bead CB contains a compressible waterproof gasket WG as above. The function of closure bead CB is to mate with another universal port unit and provide electrical insulation to its exposed electrically conductive metal contacts MC, or conductive elements. Preferably closure bead CB is formed of injection molded thermoplastic polymer.

Figure 5:
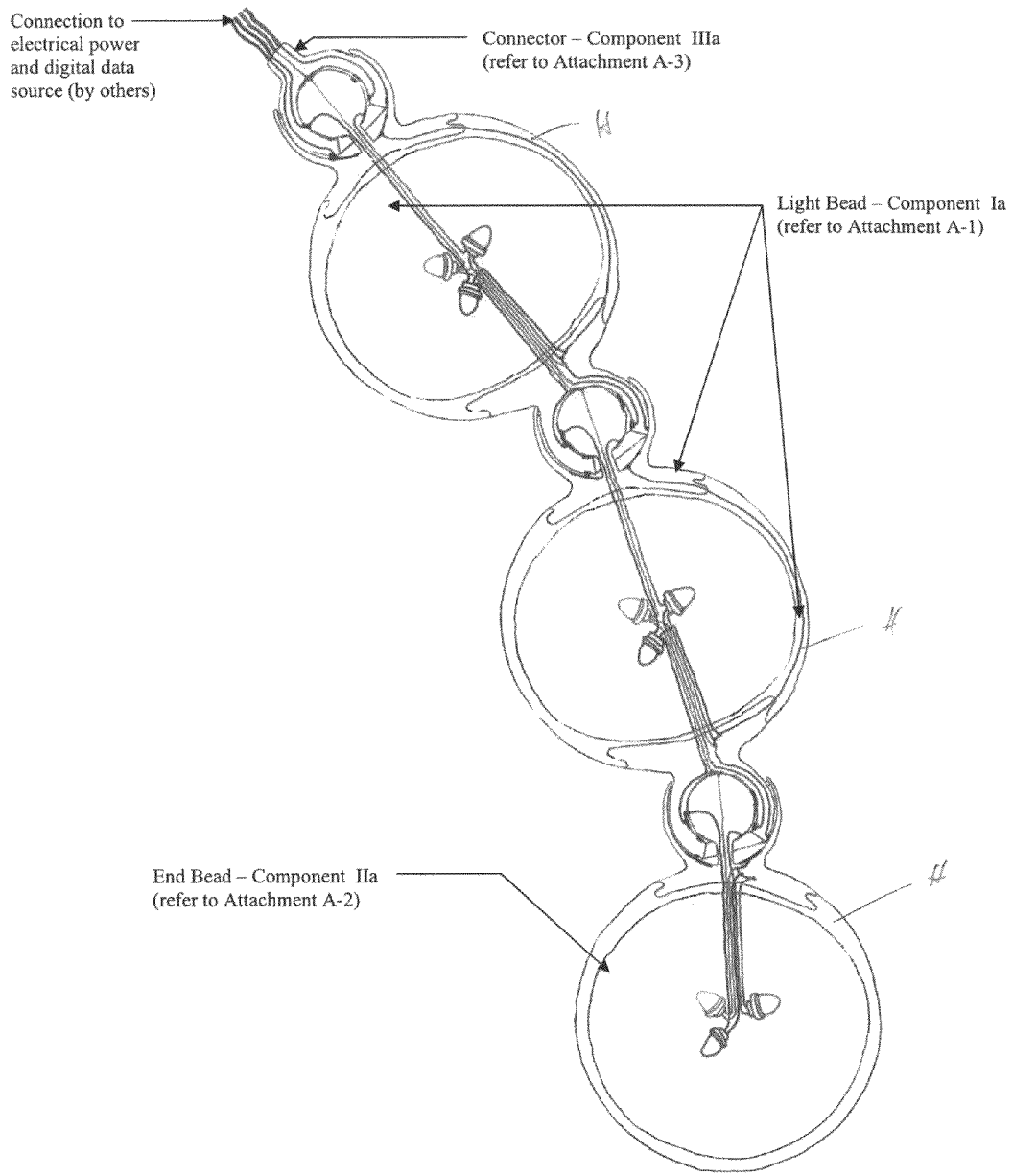
FIG. 5 illustrates a cross-section through an assembly of multiple light beads.

FIG. 5 illustrates a string of light beads as in FIGS. 1 and 2 connected together to form a garland or a strand. Three independent lines are shown running through three independent LEDs in each bead. The common return line W4 runs through the housing.

Figure 6:
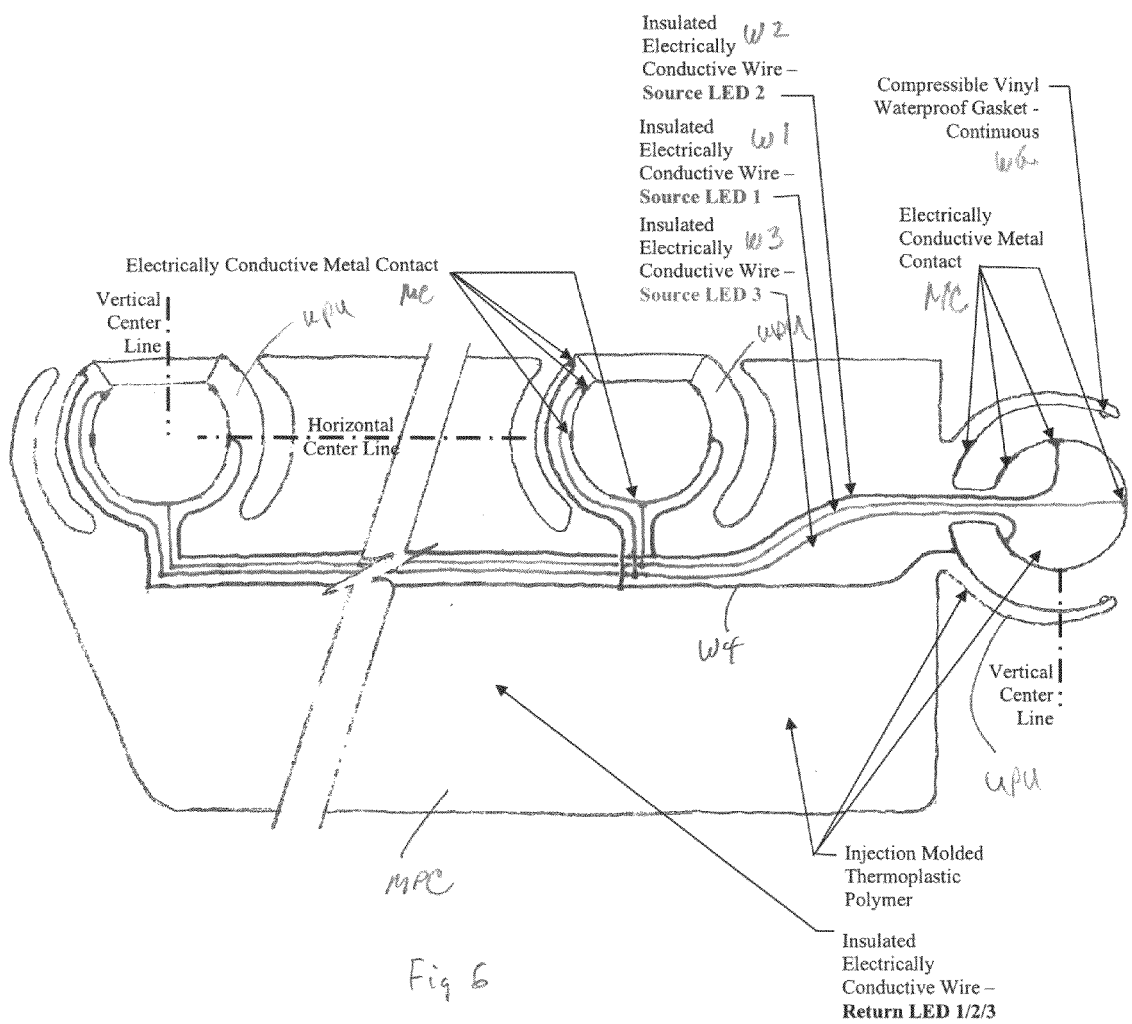
FIG. 6 illustrates a longitudinal cross-section through a light wand.
Figure 7:
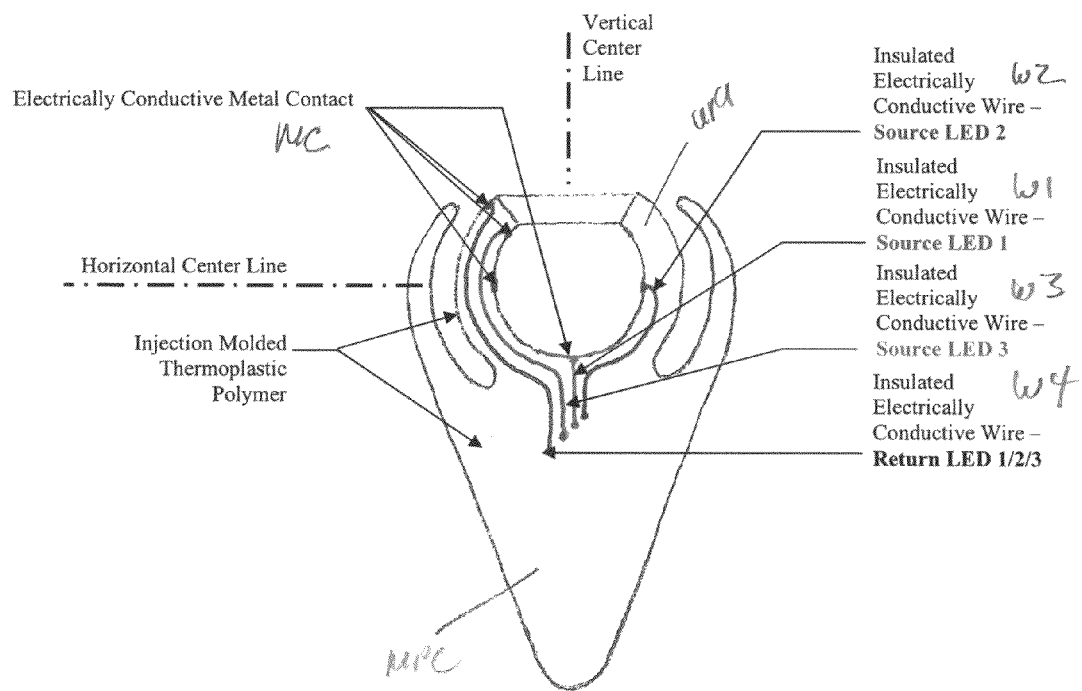
FIG. 7 illustrates a transverse cross-section through a light wand.
Figure 8:
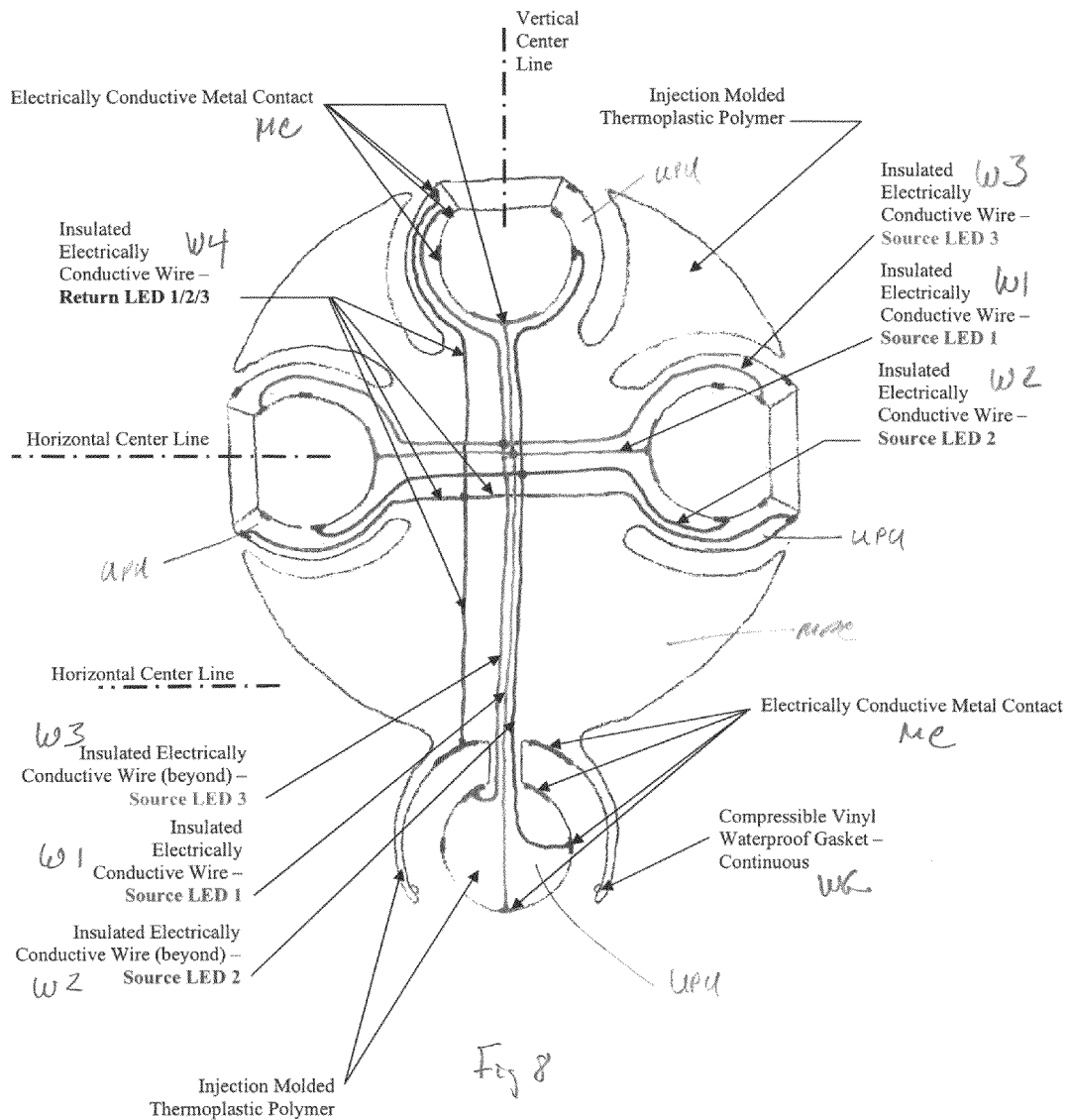
FIG. 8 illustrates a cross-section through a multiple port connector.

FIG. 6, FIG. 7 and FIG. 8 illustrate a multiple port connector. In FIG. 6 the multiple port connector is arranged into a structural length forming a light wand. Each multiple port connector MPC contains a plurality of universal port units UPU. Again, the body of the multiple port connector or light wand is preferably comprised of injection molded thermoplastic polymer.

Figure 9:
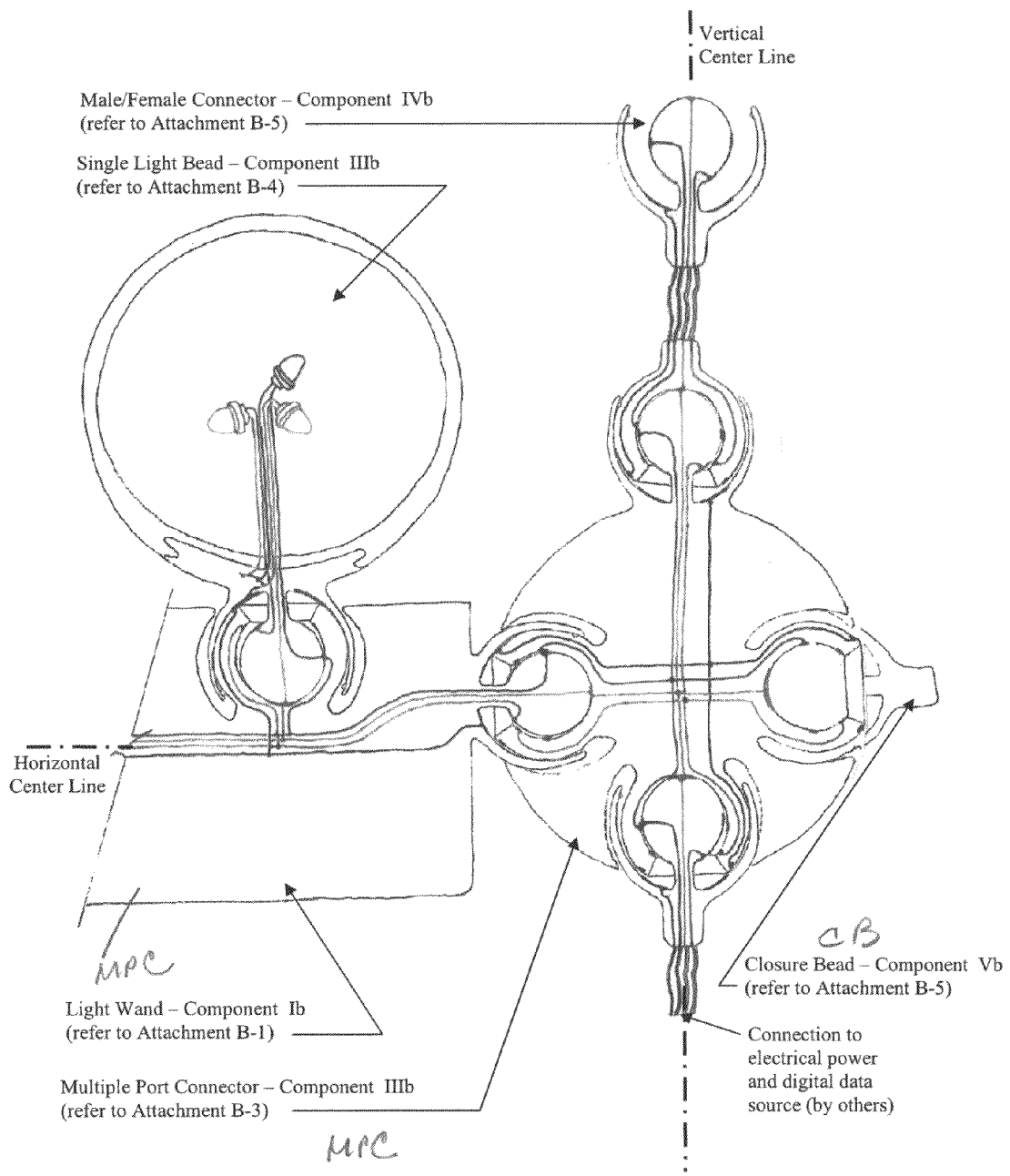
FIG. 9 illustrates a cross-section through a light wand assembly.

FIG. 9 illustrates various means for interconnecting multiple port connectors and light beads.

Figure 10:
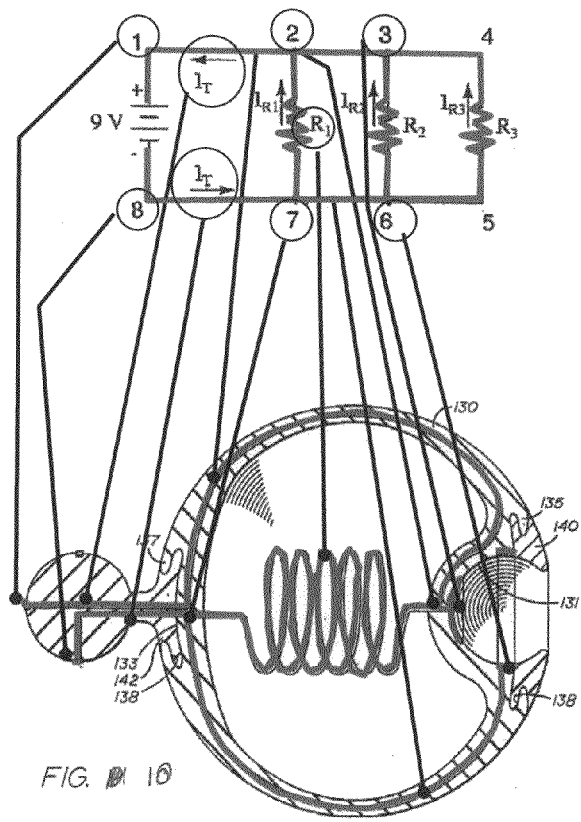
FIG. 10 illustrates a simple parallel circuit schematic.
Figure 11:
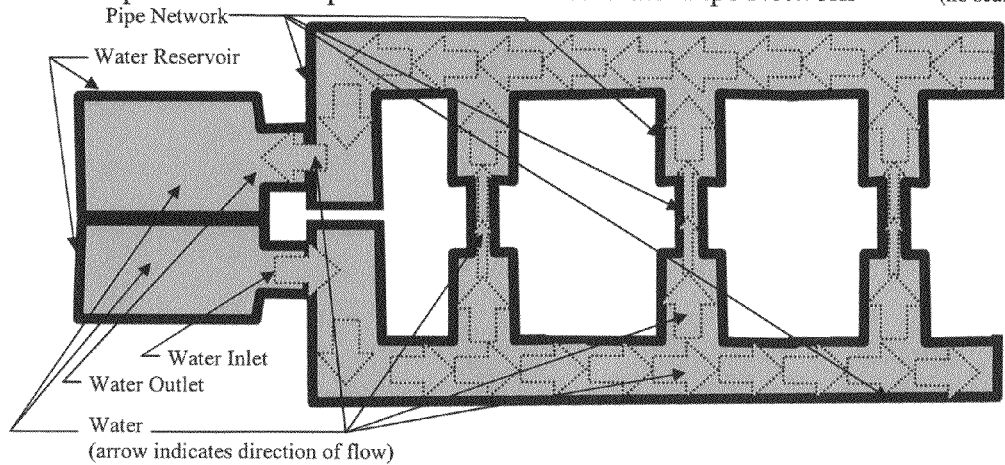
FIG. 11 illustrates a comparison of a simple parallel circuit to a water pipe network.

FIGS. 10 and 11 illustrate the principle of connecting electrical devices in parallel. FIG. 11 illustrates the parallel of an electric circuit to a water pipe network.

Comparing FIG. 1 to FIG. 10, the line running from each LED downwardly in the drawing to the black return line W4 could be considered part of the return. The lines running upwardly in the drawing from each LED should be considered to carry the same voltage as the line entering the LED. This intent and design is made clear by the simplified drawings in FIGS. 10 and 11. It is assumed that the full voltage will pass through the LED and on to the next universal port unit whether or not the LED itself is functioning or broken.

Were an electric controller connected to an end of a multiple port connector or light bead strand, and were the voltage varied in each of the three lines, it is presumed that a one way current switch is provided in each LED, or suitably close thereto, to prevent voltage from flowing in a reverse direction than that intended on any line.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A light bead comprising:
   at least 3 LED's within an at least partially transparent/translucent housing;
   the housing having at least one universal port unit including one of a mateable plug and a mateable socket, structured to mate together into a joint and to provide, when mated, full rotation and limited swivel between the two units while maintaining electric communication through the jointed units for at least four independent lines, and providing at least four separate conductivity elements; and
   with each LED electrically connected within the housing to one separate conductivity element of each universal port unit and to one common conductivity element providing a return line.

2. The light bead of claim 1 including the housing having at least two separate universal port units and providing electric conductivity for at least four separate lines through the housing from one universal port unit to the other universal port unit and providing separate electric current through the three LED's.

3. An illumination unit comprising a plurality of light beads in accordance with claim 2, having universal port units mated in sequence to form a light bead chain.

4. The illumination unit of claim 3 configured to form a drapable garland.

5. The illumination unit of claim 3 connected to at least one electric controller providing separate control for at least one conductivity line.

6. An illumination unit comprising of plurality of light beads in accordance with claim 2 and a housing device providing a plurality of universal port units for mating with the light beads.

7. The illumination unit of claim 6 including the housing forming a wand to which are attached the plurality of light beads in accordance with claim 2.

\* \* \* \* \*